United States Patent
Miner et al.

(10) Patent No.: US 10,696,386 B2
(45) Date of Patent: Jun. 30, 2020

(54) RIGID ROTOR HEAD WITH TENSION TORSION (TT) STRAP RETENTION

(71) Applicant: Sikorsky Aircraft Corporation, Stratford, CT (US)

(72) Inventors: Frederick J. Miner, Barkhamsted, CT (US); David A. Darrow, Mesa, AZ (US); Stephen V. Poulin, Milford, CT (US); Richard Thomas Hood, Fairfield, CT (US); Frank P. D'Anna, Seymour, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 102 days.

(21) Appl. No.: 15/765,119

(22) PCT Filed: Aug. 12, 2016

(86) PCT No.: PCT/US2016/046741
§ 371 (c)(1),
(2) Date: Mar. 30, 2018

(87) PCT Pub. No.: WO2017/078817
PCT Pub. Date: May 11, 2017

(65) Prior Publication Data
US 2018/0281937 A1    Oct. 4, 2018

Related U.S. Application Data

(60) Provisional application No. 62/238,435, filed on Oct. 7, 2015.

(51) Int. Cl.
*B64C 27/32* (2006.01)
*B64C 27/48* (2006.01)
(Continued)

(52) U.S. Cl.
CPC ............ *B64C 27/327* (2013.01); *B64C 27/33* (2013.01); *B64C 27/48* (2013.01); *B64C 11/06* (2013.01)

(58) Field of Classification Search
CPC ....... B64C 27/10; B64C 27/327; B64C 27/33; B64C 27/35; B64C 27/37; B64C 27/45;
(Continued)

(56) References Cited

U.S. PATENT DOCUMENTS

| 2,949,965 A | 8/1960 | De Tore et al. |
| 3,254,724 A | 6/1966 | Brooke |

(Continued)

FOREIGN PATENT DOCUMENTS

| EP | 1985536 A2 | 10/2008 |
| WO | 2015030868 A1 | 3/2015 |

OTHER PUBLICATIONS

PCT Notification of Transmittal of the International Search Report; International Application No. PCT/US 16/46741; International Filing Date: Aug. 12, 2016; dated Apr. 28, 2017; pp. 1-8.
(Continued)

*Primary Examiner* — Kenneth J Hansen
*Assistant Examiner* — Justin A Pruitt
(74) *Attorney, Agent, or Firm* — Cantor Colburn LLP (57) ABSTRACT

A box frame hub arm structure is provided and includes a body having an outboard surface, which is disposable to abut with an inboard surface of an outboard arm of an aircraft rotor head, and lead/lag sides. The body is formed to define a first cavity, an aperture communicative with the first cavity through the outboard surface and second and third cavities. The second and third cavities extend outwardly in opposite lead/lag directions from the first cavity to the lead/lag sides.

11 Claims, 6 Drawing Sheets

(51) Int. Cl.
*B64C 27/33* (2006.01)
*B64C 11/06* (2006.01)

(58) Field of Classification Search
CPC ......... B64C 27/48; B64C 27/58; B64C 27/82; B64C 11/06
USPC ........................................................ 416/106
See application file for complete search history.

(56) References Cited

U.S. PATENT DOCUMENTS

| | | |
|---|---|---|
| 3,695,779 A | 10/1972 | Kastan et al. |
| 3,942,910 A | 3/1976 | Snyder et al. |
| 4,299,539 A | 11/1981 | Schwarz et al. |
| 4,306,836 A * | 12/1981 | Mayerjak ................ B64C 27/32 416/134 A |
| 4,477,225 A | 10/1984 | Burkam |
| 5,620,305 A | 4/1997 | McArdle |
| 8,262,358 B1 * | 9/2012 | Muylaert ................ B64C 11/06 416/134 A |
| 8,777,151 B2 | 7/2014 | Muylaert et al. |
| 2010/0124501 A1 * | 5/2010 | Muylaert ................ B64C 27/33 416/134 A |
| 2013/0164129 A1 | 6/2013 | Rauber et al. |

OTHER PUBLICATIONS

PCT SR Written Opinion; International Application No. PCT/US 16/46741; International Filing Date: Aug. 12, 2016; dated Apr. 28, 2017; pp. 1-4.

* cited by examiner

RIGID ROTOR HEAD WITH TENSION TORSION (TT) STRAP RETENTION

CROSS REFERENCE TO RELATED APPLICATIONS

This application is a National Stage application of PCT/US2016/046741, filed Aug. 12, 2016, which claims the benefit of U.S. Provisional Application No. 62/238,435, filed Oct. 7, 2015, both of which are incorporated by reference in their entirety herein.

FEDERAL RESEARCH STATEMENT

This invention was made with government support with the United States Army under Contract No.: W911W6-13-2-0003. The government therefore has certain rights in this invention.

BACKGROUND OF THE DISCLOSURE

The subject matter disclosed herein relates to a rigid rotor head and, more particularly, to a vertical frame, rigid rotor head with a tension torsion (TT) strap retention assembly.

In aircraft applications, a main rotor assembly of a helicopter includes a rotor shaft, a rotor head and blades that extend outwardly from the rotor head. The rotor shaft is driven to rotate by an engine and a transmission of the helicopter and is connected to the rotor head. Thus, the rotation of the rotor shaft causes a corresponding rotation of the rotor head about the shaft axis, which in turn, leads to a rotation of the rotor blades about the shaft axis. Such rotor blade rotation generates lift and thrust for the helicopter.

Collective and cyclic control of the rotor blades provides for increased/decreased thrust and for navigational control. The ability of the rotor blades to be collectively and cyclically controlled is achieved at the rotor head by way of various components that permit and drive rotor blade pitching. These components therefore allow the rotor blades to pitch about their respective pitch axes but need to prevent undesirable leading/lagging and flapping of the rotor blades at the same time.

BRIEF DESCRIPTION OF THE DISCLOSURE

According to another aspect of the disclosure, a rotor head for use with a blade is provided and includes an outboard arm including an inboard surface, an axial retention block secured at an interior of a blade casing disposable about the outboard arm, a box frame body having an outboard surface, which is disposable to abut with the inboard surface, and lead/lag sides and which is formed to define a first cavity, an aperture communicative with the first cavity through the outboard surface and second and third cavities extending outwardly in opposite lead/lag directions from the first cavity to the lead/lag sides, a tension torsion (TT) strap, which is receivable in the first cavity to extend through the aperture and connect at an outboard end thereof with the axial retention block and a pin, which is receivable in the second and third cavities and extendable through an inboard end of the TT strap so that the TT strap transfers axial loads of the blade from the axial retention block to the box frame.

In accordance with additional or alternative embodiments, the rotor head includes inboard and outboard pitch bearings.

In accordance with additional or alternative embodiments, the blade casing is coupled to the inboard pitch bearing.

In accordance with additional or alternative embodiments, the rotor head includes a sleeve, which is disposable to pilot onto the axial retention block and a sleeve pin by which the outboard end of the TT strap is connected to the axial retention block.

In accordance with additional or alternative embodiments, the TT strap includes at least one of Kevlar™ and steel.

In accordance with additional or alternative embodiments, the box frame body includes metallic materials.

In accordance with additional or alternative embodiments, lead/lag arm portions of the outboard arm support the inboard surface and the lead/lag sides are disposable proximate to the lead/lag arm portions.

In accordance with additional or alternative embodiments, the box frame body has upper and lower sides and an inboard surface from which the first cavity is recessed.

According to another aspect of the disclosure, an aircraft is provided and includes an airframe with an extending tail and a main rotor assembly at a top portion of the airframe. The main rotor assembly includes a rotor shaft and the rotor head and the blade.

In accordance with additional or alternative embodiments, a pusher propeller assembly is located at the extending tail.

In accordance with additional or alternative embodiments, the main rotor assembly has a coaxial, counter-rotating configuration.

In accordance with additional or alternative embodiments, the main rotor assembly includes an upper rotor and a lower rotor that are both drivable in opposite directions to rotate about a main rotor axis.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

The detailed description explains embodiments of the disclosure, together with advantages and features, by way of example with reference to the drawings.

DETAILED DESCRIPTION OF THE DISCLOSURE

As will be described below, a rotor head is provided and is configured with a hub arm structure that includes a metallic vertical box frame to which an inboard end of a tension torsion (TT) strap is attached. The hub arm structure with the metallic vertical box frame serves to support an axial retention block that is mounted at a mid-length of each vertical member of the box frame hub arm. For each hub arm, a sleeve pilots onto the axial retention block and axial blade restraint against centrifugal force is created by the TT strap attached between an outboard vertical member of the hub arm and an outboard end of the blade cuff. The cuff pitches with the blade and transfers blade loads into in-board pitch bearings that in turn transfer the blade loads into the box frame.

Figure 1:
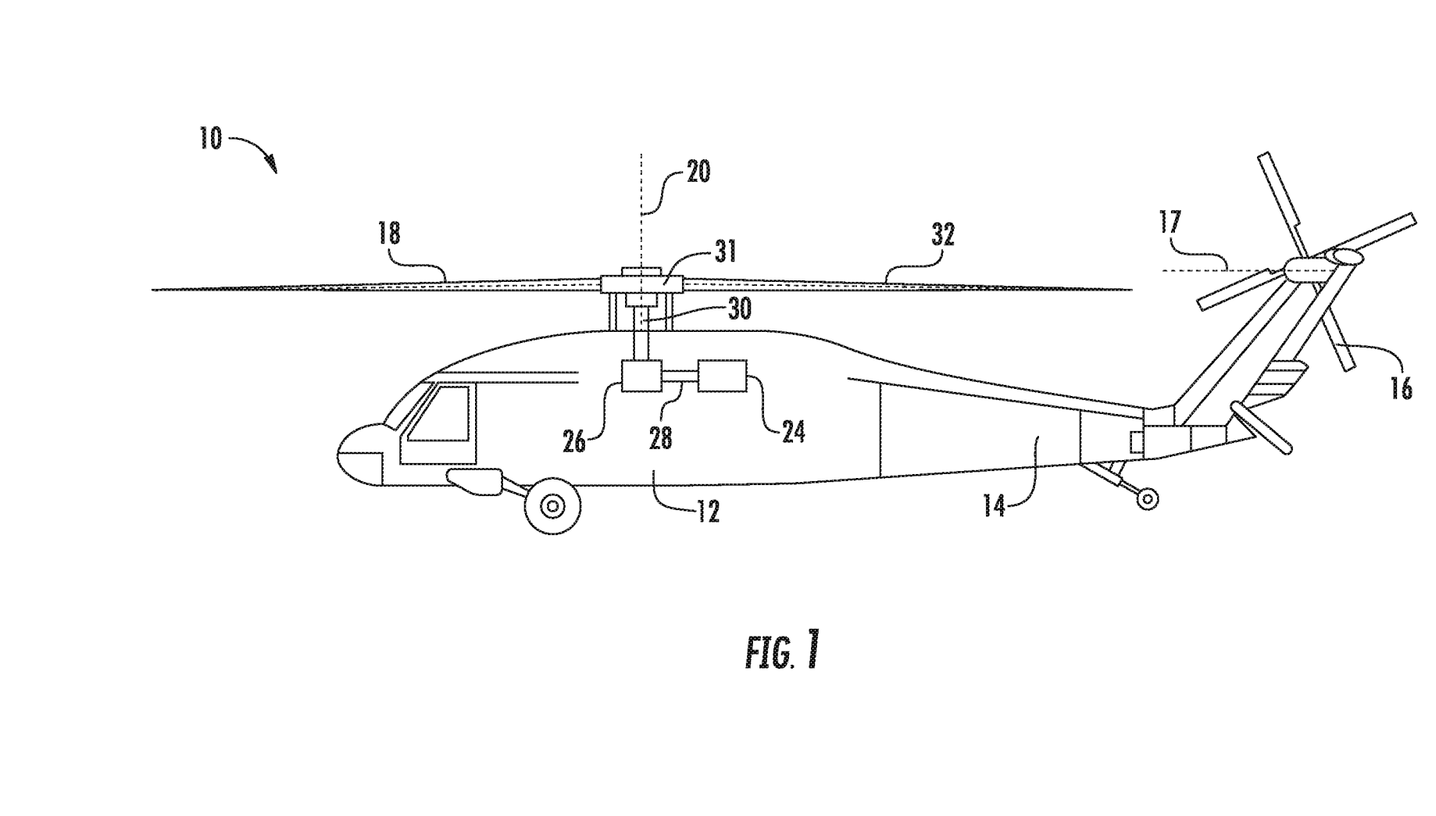
FIG. 1 is a side view of an aircraft in accordance with embodiments.

With reference to FIG. 1, an aircraft such as a helicopter 10 is provided. The helicopter 10 includes an airframe 12 with an extending tail 14. A tail rotor assembly 16 is provided at the tail 14 and is drivable to rotate about a tail rotor axis 17. A main rotor assembly 18 is located at a top portion of the airframe 12 and is drivable to rotate about a main rotor axis 20. At least the tail rotor assembly 16 and the main rotor assembly 18 are drivable by a power system including a generator 24, an engine 26 and a drive shaft 28. The engine 26 provides drive energy for at least the main rotor assembly 18 and operations of the engine 26 may be supported or powered by the generator 24. The generator 24 is connected to the engine by way of the drive shaft 28.

Figure 2:
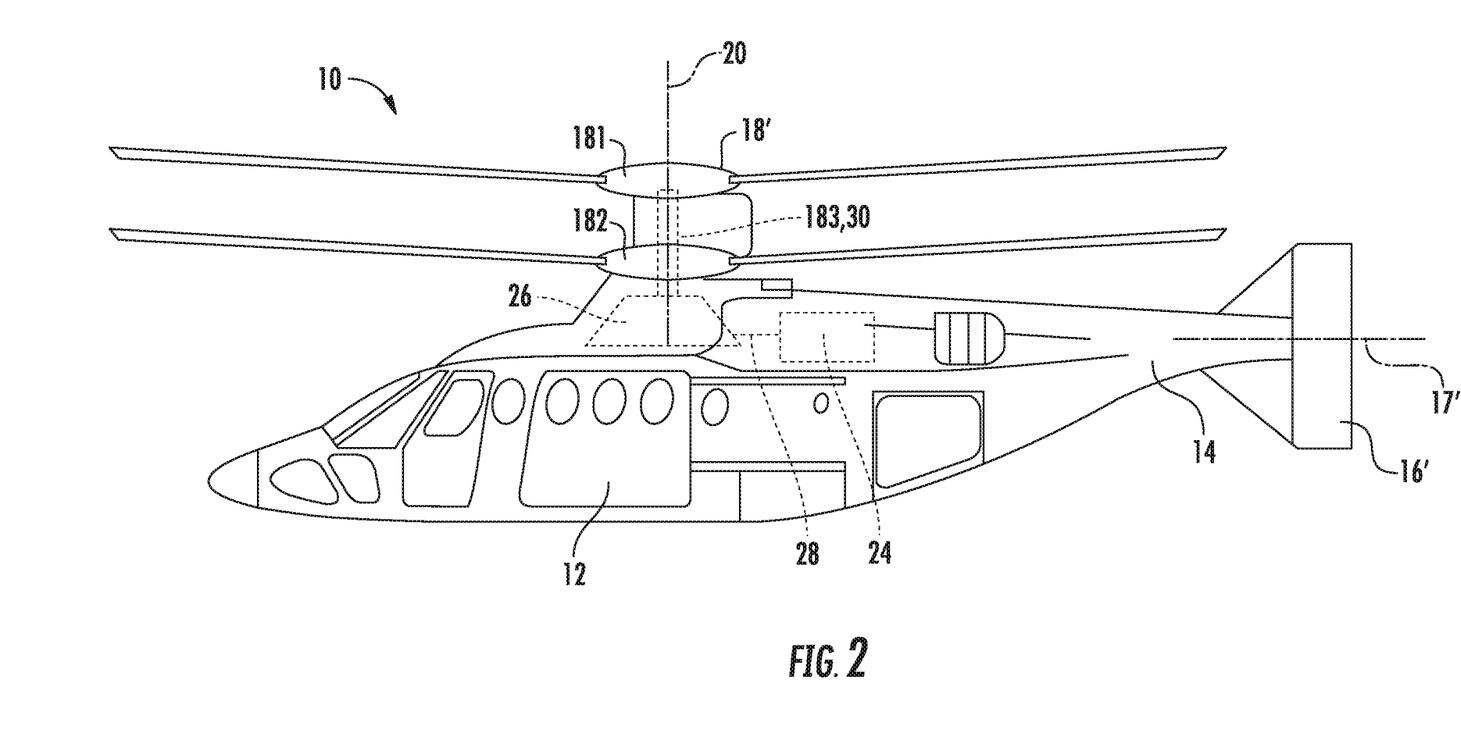
FIG. 2 is a side view of a coaxial, counter-rotating helicopter in accordance with embodiments

With reference to FIG. 2, the helicopter 10 may be provided as a coaxial, counter-rotating helicopter in accordance with some embodiments. In such cases, the helicopter 10 includes an airframe 12 with an extending tail 14. A pusher propeller assembly 16' is provided at the tail 14 and is drivable to rotate about a longitudinal tail axis 17'. A main rotor assembly 18' is located at a top portion of the airframe 12 and includes an upper rotor 181 and a lower rotor 182 that are both drivable in opposite directions by way of rotor shafts 183 (see rotor shaft 30 discussed below) to rotate about a main rotor axis 20. At least the tail rotor assembly 16' and the main rotor assembly 18' are drivable by a power system including a generator 24, an engine 26 and a drive shaft 28. The engine 26 provides drive energy for at least the main rotor assembly 18 and operations of the engine 26 may be supported or powered by the generator 24. The generator 24 is connected to the engine by way of the drive shaft 28

Figure 3:
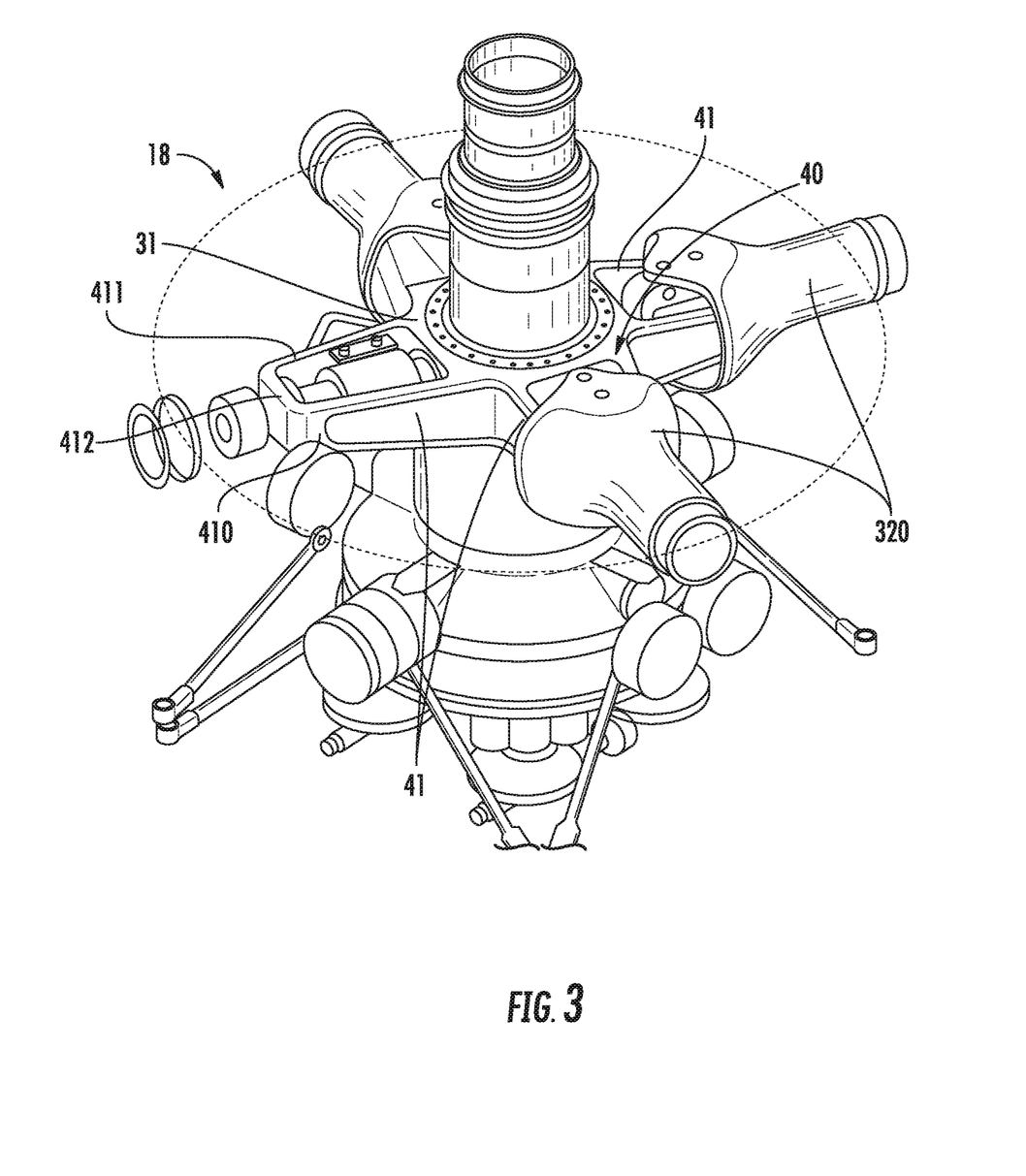
FIG. 3 is a perspective view of a rotor head in accordance with embodiments.
Figure 4:
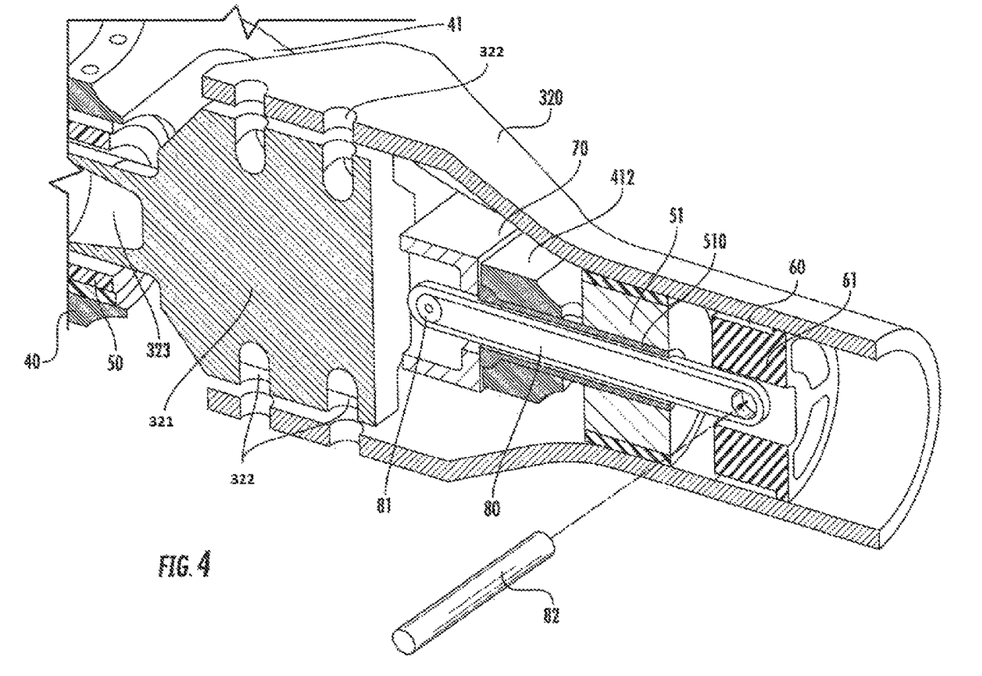
FIG. 4 is an enlarged cutaway perspective view of components of the rotor head of FIG. 3.
Figure 5:
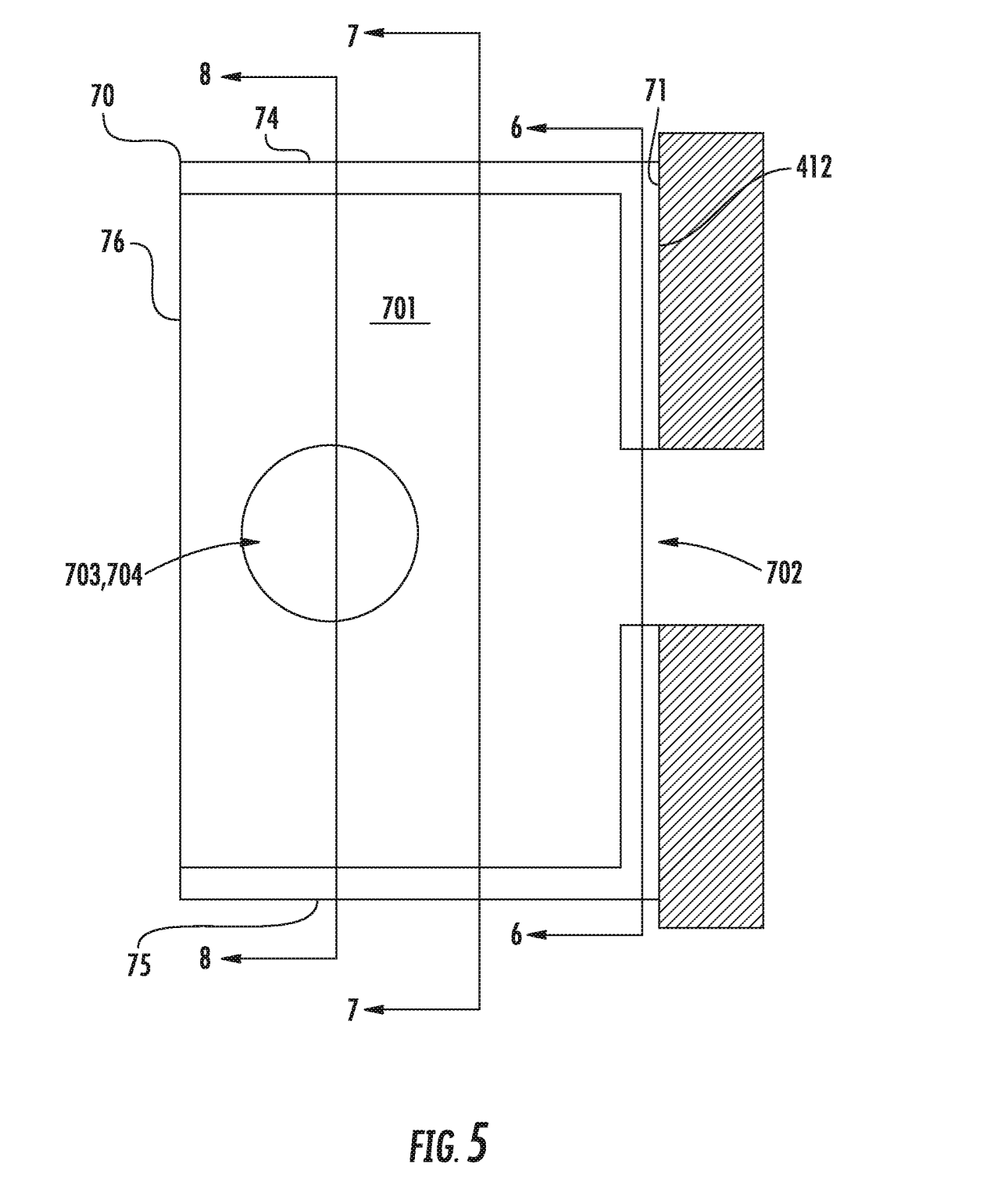
FIG. 5 is a side view of a box frame of the rotor head of FIGS. 3 and 4 to which an inboard end of a tension torsion (TT) strap is attached.

With continued reference to FIGS. 1 and 2 and with additional reference to FIGS. 3-5, the main rotor assemblies 18 and 18' may include a rotor shaft 30, a rotor head 31 and rotor blades 32 extending radially outwardly from the rotor head 31. When the main rotor assemblies 18 and 18' are driven by the power system, the rotor shaft 30 transmits rotation about the main rotor axis 20 to the rotor head 31 and the rotor head 31 in turn transmits rotation to the rotor blades 32. The resulting rotation of the rotor blades 32 about the main rotor axis 20 as well as collective and cyclic control of the rotor blades 32 generates controlled lift and thrust for the helicopter 10. In accordance with embodiment and, as shown in FIG. 3, four rotor blades 32 may be provided for the main rotor assembly 18. However, it is to be understood that additional or fewer rotor blades 32 may be provided in accordance with the present description and that the four-blade example used herein is not intended to be limiting in any way.

As shown in FIGS. 3 and 4, the rotor head 31 includes a central hub element 40 that is formed to define an annulus tightly surrounding the rotor shaft 30. The central hub element 40 includes four radial projections extending radially outwardly from the annulus as outboard arms 41. Each outboard arm 41 includes a lead arm portion 410, a lag arm portion 411 and an inboard facing surface element 412 (as used herein, the terms "lead" and "lag" refer to a direction of blade rotation but could be reversed in accordance with alternative embodiments). The lead arm portion 410 and the lag arm portion 411 taper toward one another with increasing distance from the annulus and support the inboard facing surface element 412 at a distance from the annulus. The lead arm portion 410, the lag arm portion 411 and the inboard facing surface element 412 thus cooperatively form a trap feature defining a trapezoidal (when viewed from above) aperture.

Each rotor blade 32 includes a blade casing 320. A portion of the blade casing 320 is disposable about a corresponding one of the outboard arms 41 and another portion is disposable about an inboard blade connector 321. The blade casing 320 has a relatively narrow outboard portion beyond the inboard facing surface element 412 and a relatively bulged inboard portion that is bolted to the inboard blade connector 321 at bolt-holes 322. The inboard blade connector 321 has an inboard connection piece 323 that connects to the central hub element 40 by way of an inboard pitch bearing 50.

Within the relatively narrow outboard portion, the blade casing 320 is supportive of an outboard pitch bearing 51, which includes a bearing support 510, and a sleeve 60. The rotor head 31 further includes an axial retention block 61 that transfers centrifugal loading from the blade casing 320 to a TT strap 80 (to be described below). The axial retention block 61 is proximate to the sleeve 60 and a TT strap retaining box frame body 70 (hereinafter referred to as a "box frame body 70"). During assembly of the rotor head 31, the sleeve 60 pilots onto the axial retention block 61 in order to secure the axial retention block 61 within the blade casing 320 at a given radial location outside of the inboard facing surface element 412.

Figure 6:
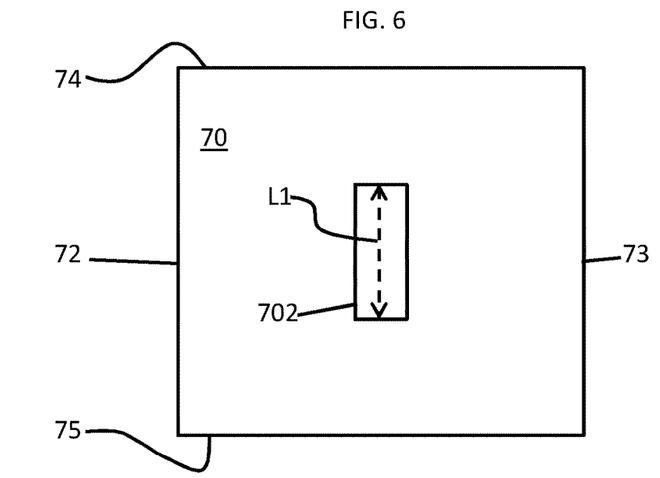
FIG. 6 is a cross sectional view of the box frame of the rotor head of FIGS. 3 and 4 taken along line 6-6 of FIG. 5.
Figure 7:
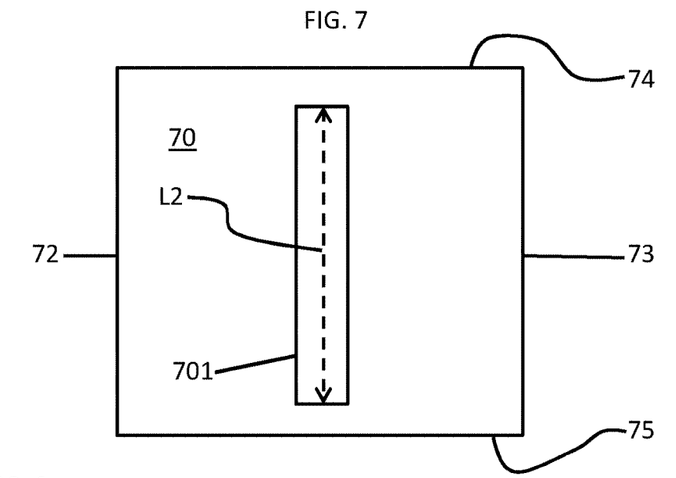
FIG. 7 is a cross sectional view of the box frame of the rotor head of FIGS. 3 and 4 taken along line 7-7 of FIG. 5.
Figure 8:
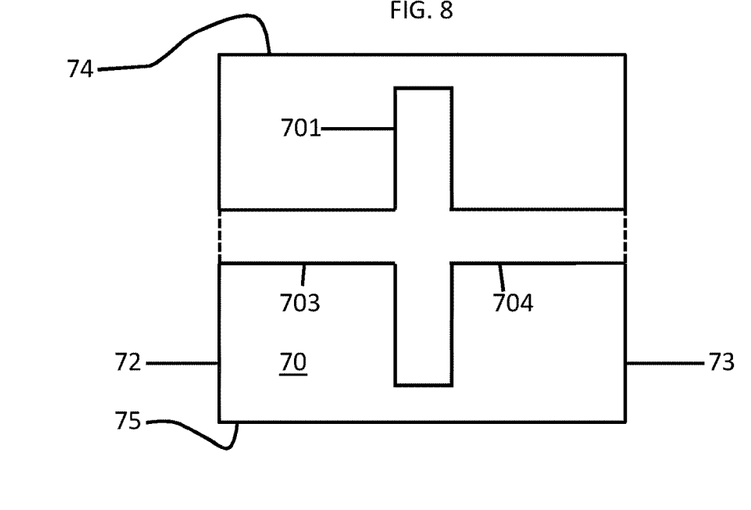
FIG. 8 is a cross sectional view of the box frame of the rotor head of FIGS. 3 and 4 taken along line 8-8 of FIG. 5.

FIGS. 4 and 5 are cross sectional views of the blade casing 320 showing an interior of the blade casing 320 and the box frame 70 and showing a connection between the TT strap 80, the box frame 70 and the axial retention block 61. FIGS. 6-8 are cross sectional views of the box frame 70 without the cross section shown in FIGS. 4 and 5.

With continued reference to FIGS. 3 through 5 and with additional reference to FIGS. 6-8, the box frame body 70 has an outboard facing surface 71, which is disposable (i.e., able to be positioned) in order to abut with the inboard facing surface element 412, a lead side 73 (see FIG. 8) that may be disposed to be correspondingly proximate to the lead arm portion 410 and a lag side 72 (see FIG. 8) that may be disposed to be correspondingly proximate to the lag arm portion 411. The box frame body 70 further includes an upper side 74 facing away from the airframe 12, a lower side 75 facing toward the airframe 12 and an inboard facing surface 76.

The box frame body 70 is a generally solid metallic body that is formed to define a first cavity 701, which is recessed from the inboard facing surface 76, an aperture 702, a second cavity 703 and a third cavity 704. The aperture 702 is communicative with the first cavity 701 through the outboard facing surface 71. The second and third cavities 703 and 704 extend outwardly in opposite lead/lag directions, respectively, from the first cavity 701 and toward the lead and lag sides 73 and 72. In accordance with embodiments, the aperture 702 may have a substantially rectangular cross-sectional shape of a first longitudinal length L1 (see FIG. 6) and the first cavity 701 may have a substantially rectangular cross-sectional shape of a second longitudinal length L2, which is longer than L1 (see FIG. 7). An outboard plane of the first cavity 701 may be coplanar with an inboard plane of the aperture 702. The second and third cavities 703 and 704 may have similarly circular cross-sectional shapes with the second cavity 703 extending from the lead side 73 to the corresponding side of the first cavity 701 and with the third cavity 704 extending from the lag side 72 to the corresponding side of the first cavity 701.

The rotor head 31 also includes a tension torsion (TT) strap 80, a TT strap pin 81 and a sleeve pin 82. The TT strap 80 may be formed of metal materials, such as steel, and Kevlar™ and is receivable in the first cavity 701 to extend through the aperture 702, through a corresponding aperture in the inboard facing surface element 412 and through the hearing support 510 of the outboard bearing 51. The TT strap 80 is thus connectable at an outboard end thereof with the axial retention block 61. The TT strap pin 81 is receivable in the second and third cavities 703 and 704 and extendable through an inboard end of the TT strap 80. The sleeve pin 82 is extendable through the outboard end of the TT strap 80 and into the axial retention block 61.

Axial blade restraint against centrifugal force cause by blade rotation about the main rotor axis 20 is provided by the TT strap 80 being securely connected to the box frame body 70 by the TT strap pin 81 and to the axial retention block 61 by the sleeve pin 82. Meanwhile, the sleeve 60 pitches with the rotor blade 32 and thus transfers blade loads into the inboard and outboard pitch bearings 50 and 51. The inboard and outboard pitch bearings 50 and 51 in turn transfer the blade loads into the corresponding one of the outboard arms 41.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A rotor head for use with a blade, comprising:
    an outboard arm including an inboard surface;
    an axial retention block secured at an interior of a blade casing disposable about the outboard arm;
    a box frame body having an outboard surface, which is disposable to abut with the inboard surface, and lead/lag sides and which is formed to define a first cavity, an aperture communicative with the first cavity through the outboard surface and second and third cavities extending outwardly in opposite lead/lag directions from the first cavity to the lead/lag sides;
    a tension torsion (TT) strap, which is receivable in the first cavity to extend through the aperture and connect at an outboard end thereof with the axial retention block, and
    a pin, which is receivable in the second and third cavities and extendable through an inboard end of the TT strap so that the TT strap transfers axial loads of the blade from the axial retention block to the box frame.

2. The rotor head according to claim 1, further comprising inboard and outboard pitch bearings which react non-axial loads from the blade.

3. The rotor head according to claim 1, wherein the blade casing is coupled to the inboard pitch bearing.

4. The rotor head according to claim 1, further comprising:
    a sleeve, which is disposable to pilot onto the axial retention block; and
    a sleeve pin by which the outboard end of the TT strap is connected to the axial retention block.

5. The rotor head according to claim 1, wherein the box frame body comprises metallic materials.

6. The rotor head according to claim 1, further comprising lead/lag arm portions of the outboard arm to support the inboard surface, wherein the lead/lag sides are disposable proximate to the lead/lag arm portions.

7. The rotor head according to claim 1, wherein the box frame body has upper and lower sides and an inboard surface from which the first cavity is recessed.

8. An aircraft, comprising:
    an airframe with an extending tail; and
    a main rotor assembly at a top portion of the airframe,
    the main rotor assembly comprising a rotor shaft and the rotor head and the blade according to claim 1.

9. The aircraft according to claim 8, further comprising a pusher propeller assembly at the extending tail.

10. The aircraft according to claim 8, wherein the main rotor assembly has a coaxial, counter-rotating configuration.

11. The aircraft according to claim 8, wherein the main rotor assembly comprises an upper rotor and a lower rotor that are both drivable in opposite directions to rotate about a main rotor axis.

* * * * *